(12) United States Patent
Yoo et al.

(10) Patent No.: US 9,304,967 B2
(45) Date of Patent: Apr. 5, 2016

(54) RECONFIGURABLE PROCESSOR USING POWER GATING, COMPILER AND COMPILING METHOD THEREOF

(75) Inventors: Sung-Joo Yoo, Pohang-si (KR); Yeon-Gon Cho, Hwaseong-si (KR); Bernhard Egger, Seoul (KR); Won-Sub Kim, Anyang-si (KR); Hee-Jin Ahn, Seoul (KR)

(73) Assignees: Samsung Electronics Co., Ltd., Suwon-si (KR); POSTECH ACADEMY-INDUSTRY FOUNDATION, Pohang-Si (KR)

( * ) Notice: Subject to any disclaimer, the term of this patent is extended or adjusted under 35 U.S.C. 154(b) by 754 days.

(21) Appl. No.: 13/213,333

(22) Filed: Aug. 19, 2011

(65) Prior Publication Data

US 2012/0185673 A1    Jul. 19, 2012

(30) Foreign Application Priority Data

Jan. 19, 2011    (KR) .................. 10-2011-0005585

(51) Int. Cl.
| | | |
|---|---|---|
| G06F 9/45 | (2006.01) | |
| G06F 15/78 | (2006.01) | |
| G06F 9/30 | (2006.01) | |
| G06F 9/38 | (2006.01) | |
| G06F 1/32 | (2006.01) | |

(52) U.S. Cl.
CPC .......... *G06F 15/7867* (2013.01); *G06F 1/3287* (2013.01); *G06F 8/447* (2013.01); *G06F 8/4432* (2013.01); *G06F 9/30083* (2013.01); *G06F 9/30189* (2013.01); *G06F 9/3889* (2013.01); *Y02B 60/1282* (2013.01)

(58) Field of Classification Search
None
See application file for complete search history.

(56) References Cited

U.S. PATENT DOCUMENTS

| | | | | | |
|---|---|---|---|---|---|
| 5,996,083 | A | * | 11/1999 | Gupta et al. | 713/322 |
| 6,219,796 | B1 | * | 4/2001 | Bartley | 713/320 |
| 6,427,234 | B1 | * | 7/2002 | Chambers et al. | 717/140 |
| 2002/0184548 | A1 | * | 12/2002 | Lin | 713/322 |
| 2003/0098898 | A1 | * | 5/2003 | Vanhooydonck et al. | 347/41 |
| 2004/0002823 | A1 | * | 1/2004 | Aldridge et al. | 702/60 |
| 2004/0237056 | A1 | * | 11/2004 | Okada | 716/2 |
| 2007/0288930 | A1 | * | 12/2007 | Yim et al. | 718/107 |
| 2009/0070552 | A1 | | 3/2009 | Kanstein et al. | |
| 2009/0119490 | A1 | | 5/2009 | Oh et al. | |
| 2009/0235241 | A1 | | 9/2009 | Luk et al. | |
| 2010/0164949 | A1 | * | 7/2010 | Min et al. | 345/419 |
| 2010/0205405 | A1 | | 8/2010 | Jin et al. | |
| 2010/0268862 | A1 | * | 10/2010 | Park et al. | 711/101 |
| 2010/0274939 | A1 | * | 10/2010 | Egger et al. | 710/266 |
| 2011/0099555 | A1 | * | 4/2011 | Kwon et al. | 718/108 |
| 2011/0219207 | A1 | * | 9/2011 | Suh et al. | 712/7 |
| 2011/0238963 | A1 | * | 9/2011 | Kim et al. | 712/229 |

FOREIGN PATENT DOCUMENTS

| | | |
|---|---|---|
| JP | 2009-530924 | 8/2009 |
| KR | 10-2009-0047326 | 5/2009 |
| KR | 10-2010-0092230 | 8/2010 |

* cited by examiner

*Primary Examiner* — Jason Mitchell
(74) *Attorney, Agent, or Firm* — NSIP Law

(57) ABSTRACT

Provided is a reconfigurable processor that may process a first type of operation in first mode using a first group of functional units, and process a second type of operation in second mode using a second group of functional units. The reconfigurable processor may selectively supply power to either the first group or the second group, in response to a mode-switch signal or a mode-switch instruction.

7 Claims, 6 Drawing Sheets

RECONFIGURABLE PROCESSOR USING POWER GATING, COMPILER AND COMPILING METHOD THEREOF

CROSS-REFERENCE TO RELATED APPLICATION(S)

This application claims the benefit under 35 U.S.C. §119(a) of Korean Patent Application No. 10-2011-0005585, filed on Jan. 19, 2011, in the Korean Intellectual Property Office, the entire disclosure of which is incorporated herein by reference for all purposes.

BACKGROUND

1. Field

The following description is related to a reconfigurable processor and a compiler for the reconfigurable processor.

2. Description of the Related Art

Generally, reconfigurable architecture refers to an architecture in which the hardware configuration of a computing device may be changed to optimally perform a task.

When a task is processed only in a hardware manner, it is difficult to efficiently carry out the task if changes occur in the process of the task. This difficulty is caused because of the fixed configuration of the hardware. In contrast, if a task is processed only in a software manner, the task can be processed by reconfiguring the software if changes occur in the process of a task, however, the processing speed is slower than when the data is processed in a hardware manner.

Reconfigurable architecture combines the advantages of both hardware and software to process a task. Such reconfigurable architecture has drawn more attention from the digital signal processing field in which an operation is repeatedly processed.

One type of reconfigurable architecture is a coarse-grained array (CGA). A coarse-grained array typically consists of a number of processing units, and the connection between the processing units is adjusted to more optimally process a specific task.

Recently, a reconfigurable architecture has been introduced which utilizes a specific processing unit of a coarse-grained array as a very long instruction word (VLIW) machine. This reconfigurable architecture has two execution modes, including CGA mode and VLIW mode. In the CGA mode, typically an iterative loop operation is processed, and in VLIW mode, typically general operations other than a loop operation are processed.

SUMMARY

In one general aspect, there is provided a reconfigurable processor using power gating, the reconfigurable processor including a processing unit comprising a plurality of functional units that are configured to process a first type of operation in a first mode using a first group comprising at least one functional unit, and configured to process a second type of operation in second mode using a second group comprising at least one functional unit, and a power managing unit configured to selectively supply power to either the first group or the second group, in response to a mode-switch signal or a mode-switch instruction that directs switching between the first mode and the second mode.

The processing unit may be further configured to process a loop operation using a coarse-grained array (CGA) module that is defined as the first group in CGA mode, and to process operations other than a loop operation using a very long instruction word (VLIW) module that is defined as the second group in VLIW mode.

The power managing unit may be further configured to shut off power supplied to the CGA module, in response to a mode-switch signal or a mode-switch instruction that directs switching from CGA mode to VLIW mode, and configured to shut off power supplied to the VLIW module, in response to a mode-switch signal or a mode-switch instruction that directs switching from VLIW mode to CGA mode.

The power managing unit may be further configured to supply power to the VLIW module before CGA mode is switched to VLIW mode, and to supply power to the CGA module before VLIW mode is switched to CGA mode.

In another aspect, there is provided a compiler for a reconfigurable processor that comprises a coarse-grained array (CGA) mode and a very long instruction word (VLIW) mode, the compiler configured to insert an instruction into a program to be run in the reconfigurable processor to cause the reconfigurable processor to power on a VLIW module for VLIW mode before CGA mode is switched to VLIW mode.

In another aspect, there is provided a compiler for a reconfigurable processor that comprises a coarse-grained array (CGA) mode and a very long instruction word (VLIW) mode, the compiler configured to insert an instruction into a program to be run in the reconfigurable processor to cause the reconfigurable processor to power on a CGA module for CGA mode before VLIW mode is switched to CGA mode.

In another aspect, there is provided a compiler for a reconfigurable processor that comprises a plurality of functional units, that processes a loop operation in a coarse-grained array (CGA) mode based on a CGA module that comprises at least one functional unit, and that processes an operation other than the loop operation in a very long instruction word (VLIW) mode based on a VLIW module that comprises at least one functional unit, the compiler including a first compiling unit configured to detect a loop exit decision node that is defined as a node that determines whether to terminate iterative execution of a loop in a data dependency graph of a program to be run in the reconfigurable processor, and to insert a VLIW power-on instruction into a node next to the detected loop exit decision node and prior to a loop exit node to cause the reconfigurable processor to supply power to the VLIW module, and a second compiling unit configured to detect a CGA entry node that stores context for switching the VLIW mode to the CGA mode from a control flow graph of a program to be run in the reconfigurable processor, and to insert a CGA power-on instruction into a node prior to the detected CGA entry node to cause the reconfigurable processor to supply power to the CGA module.

The second compiling unit may be further configured to insert a CGA power-off instruction into a node present on a branch path in a direction of the other CGA entry node to shut off power to the CGA module, in response to a node preceding the detected CGA entry node being a branch node and another CGA entry node not being present on another branch path other than the branch path that is in the direction of the detected CGA entry node.

In another aspect, there is provided a method of compiling for a reconfigurable memory that comprises a plurality of functional units, that processes a loop operation in a coarse-grained array (CGA) mode based on a CGA module that comprises at least one functional unit, and that processes an operation other than a loop operation in a very long instruction word (VLIW) mode based on a VLIW module that comprises at least one functional unit, the method including detecting a loop exit decision node that is defined as a node that determines whether to terminate iterative execution of a loop in a data dependency graph of a program to be run in the reconfigurable processor, and inserting a VLIW power-on instruction into a node next to the detected loop exit decision node and prior to a loop exit node to cause the reconfigurable processor to supply power to the VLIW module, and detecting a CGA entry node that stores context for switching the VLIW mode to the CGA mode from a control flow graph of a program to be run in the reconfigurable processor, and inserting a CGA power-on instruction into a node prior to the detected CGA entry node to cause the reconfigurable processor to supply power to the CGA module.

The CGA power-on instruction may comprise inserting a CGA power-off instruction into a node present on a branch path in a direction of the other CGA entry node to shut off power to the CGA module, in response to a node preceding the detected CGA entry node being a branch node and another CGA entry node not being present on another branch path other than the branch path that is in the direction of the detected CGA entry node.

In another aspect, there is provided a compiler for a reconfigurable processor that is to process a program that is represented by nodes on a data dependency graph, the compiler including a first compiling unit configured to analyze the data dependency to detect a loop exit decision node that determines whether to execute a loop, and configured to insert a very long instruction word (VLIW) power-on instruction into a node on the data dependency graph that is after the loop exit decision node and previous to a loop exit node, and a second compiling unit configured to analyze the data dependency graph to detect a coarse-grained array (CGA) entry node, and configured to insert a CGA power-on instruction into a node on the data dependency graph that is previous to the CGA entry node.

The nodes on the data dependency graph may be instructions, constants, and/or variables for processing the program, and the reconfigurable processor may be configured to process the program based on the instructions, constants, and/or variables included in the nodes of the dependency graph.

The second compiling unit may be further configured to analyze the data dependency graph to detect whether a path branch is present in a node preceding the detected CGA entry node, and configured to insert a CGA power-off instruction into a node on a branch path that does not include a CGA entry node to prevent unnecessary activation of the CGA.

The compiler may analyze the data dependency graph while the reconfigurable processor is processing the program based on the data dependency graph.

The compiler may be included in the reconfigurable processor.

The reconfigurable processor may process the VLIW power-on instruction to cause the reconfigurable processor to power on a VLIW module of the reconfigurable processor, prior to processing the loop exit node.

The reconfigurable processor may process the CGA power-on instruction to cause the processor to power on a CGA module of the reconfigurable processor, prior to processing the CGA entry node.

Other features and aspects may be apparent from the following detailed description, the drawings, and the claims.

Figure 1:
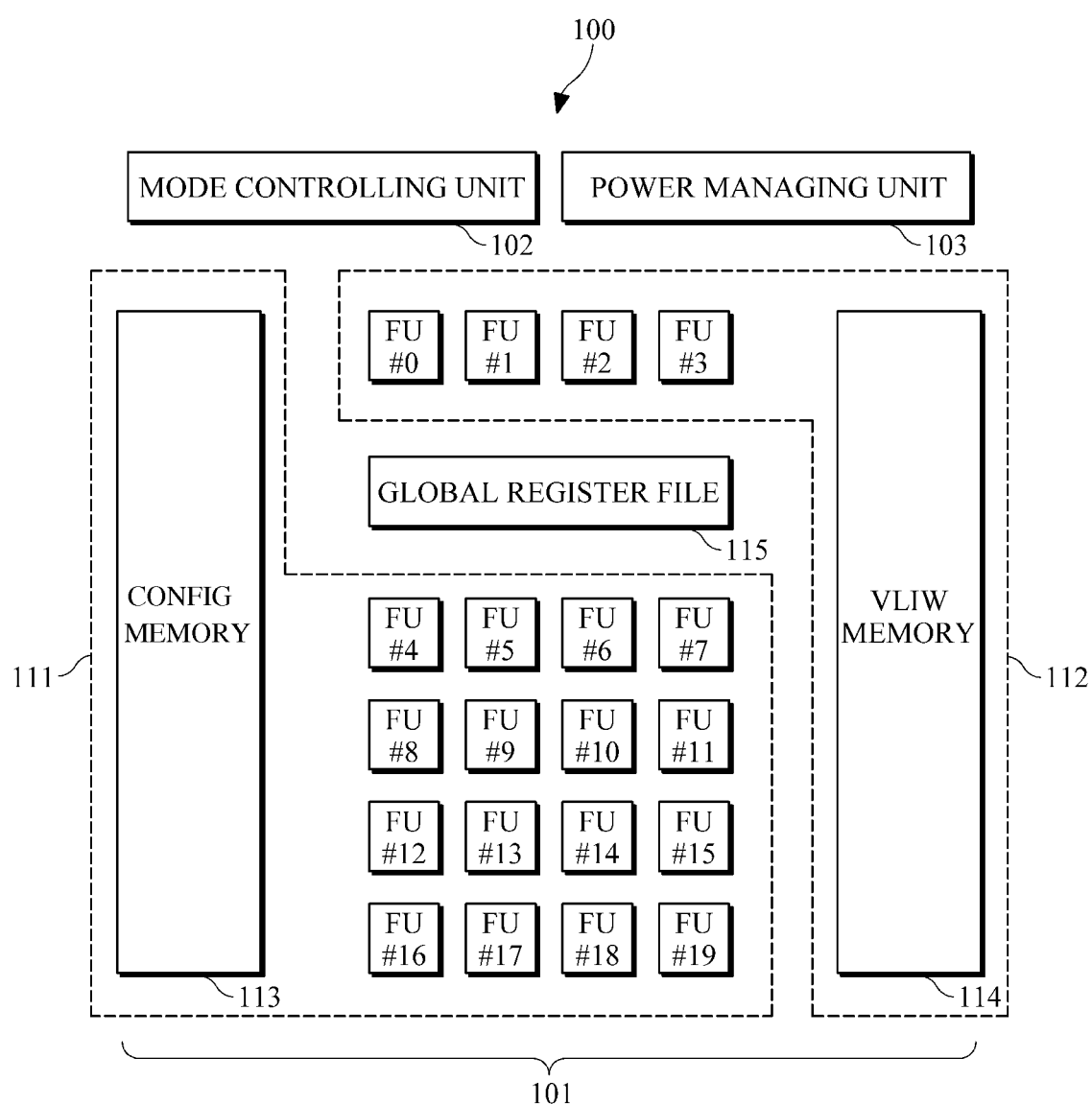
FIG. 1 is a diagram illustrating an example of a reconfigurable processor.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates a reconfigurable processor (RP processor). The reconfigurable processor may be included in a terminal, for example, a computer, a mobile terminal, a smart phone, a camera, an MP3 player, a tablet, and the like.

Referring to the example illustrated in FIG. 1, RP processor 100 includes a processing unit 101, a mode controlling unit 102, and a power managing unit 103.

The processing unit 101 may include a plurality of functional units (that are referred to as "FUs". Each FU may process a job or a task independently. Each FU may include a processing core and a register file.

The processing unit 101 may have two execution modes, for example, a coarse-grained array (CGA) mode and a very long instruction word (VLIW) mode.

In CGA mode, the processing unit 101 may operate as a CGA module 111. For example, the CGA module 111 may include sixteen (16) FUs such as FU#4 to FU#19 and a configuration memory 113. In this example, FU#4 through FU#19 may process a loop in parallel. Connections between the FUs #4 through #19, or a network structure of the FUs #4 through #19 may be optimized based on a loop to be processed by the CGA module 111. Configuration information of the connections between the FUs #4 through #19 and the network may be stored in the configuration memory 113. In this example, in CGA mode, the processing unit 101 may process a loop using the CGA module 111 based on the configuration information stored in the configuration memory 113.

In VLIW mode, the processing unit 101 may operate as a VLIW module 112. For example, the VLIW module 112 may include four (4) FUs such as FU#0 to FU#3 and a VLIW memory 114. Each of FU#0 to FU#3 may process a very long instruction according to VLIW architecture. In this example, in VLIW mode, the processing unit 101 may process an operation using the VLIW module 112 based on an instruction stored in the VLIW memory 114.

As another example, some FUs may be used in both VLIW mode and CGA mode. For example, in the example illustrated in FIG. 1, FU#4 through FU#7 may operate as a VLIW machine in VLIW mode.

The mode controlling unit 102 may control switching from CGA mode to VLIW mode or from VLIW mode to CGA mode. The mode controlling unit 102 may generate a predefined mode switch signal or a predefined mode-switch instruction. For example, in the process of processing a loop operation in CGA mode, the processing unit 101 may switch to VLIW mode based on a mode-switch signal of the mode controlling unit 102, to process an operation other than the loop operation. In this example, the loop execution result may be temporarily stored in a global register file 115. As another example, the processing unit 110 operating in VLIW mode may be switched to CGA mode, in response to a control signal of the mode controlling unit 102. In response to switching to CGA mode, the processing unit 110 may retrieve context information from the global register file 115 and proceed with processing the loop operation that was previously in process and that has an execution result temporarily stored.

The power managing unit 103 may shut off the power that is supplied to the VLIW module 112 in CGA mode, and shut off the power that is supplied to the CGA module 111 in VLIW mode. For example, the power managing unit 103 may selectively determine the power supply of either module 111 or module 112 to shut off based on a mode-switch signal or a mode-switch instruction of the mode controlling unit 102.

In addition, the power managing unit 103 may activate the power supply to the VLIW module 112 when CGA mode is switched to VLIW mode. For example, the power supply to the VLIW module 112 may be reactivated. As another example, the power managing unit 103 may activate the power supply to the CGA module 111 when VLIW mode is switched to CGA mode.

In this example, each module 111 and 112 may not wake immediately upon the activation of the power supply. In other words, even when the power supply is activated, the module 111 is or the module 112 may take a period of time to fully wake up. Thus, as an example, the power managing unit 103 may activate the power supply to the VLIW module 112 before switching from CGA mode to VLIW mode, or vice versa.

Figure 2:
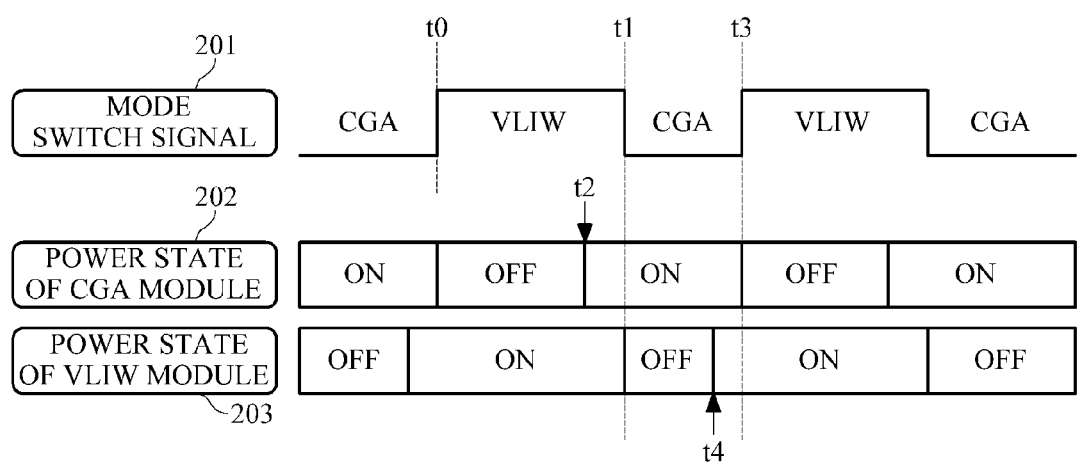
FIG. 2 is a diagram illustrating an example of mode switch and power gating of a reconfigurable processor.

FIG. 2 illustrates an example of mode switch and power gating of a reconfigurable processor.

Referring to the examples illustrated in FIGS. 1 and 2, the processing unit 101 may operate either in CGA mode or in VLIW mode based on a mode-switch signal 201 of the mode controlling unit 102. In the example of FIG. 2, the processing unit 101 operates in VLIW mode during a time period from t0 to t1, and operates in CGA mode during a time period from t1 to t3.

Reference numeral 202 denotes a power state of the CGA module 111. Based on the mode-switch signal 201, the CGA module 111 is in POWER-OFF state from t0. Next, the CGA module 111 returns to POWER-ON state from t1. In this example, to prevent a delay from occurring because the CGA module 111 is not fully awake at the time t1 at the time power is activated, the power managing unit 103 may activate the power supply to the CGA module 111 at a time t2 that is before t1 at which the CGA mode begins. Accordingly, at the time t1 at which CGA mode begins, the CGA module 111 is already powered on, and thus, the CGA module 111 is able to operate without delay.

Reference numeral 203 denotes a power state of the VLIW module 112. Based on the mode-switch signal 201, the VLIW module 112 is in POWER-OFF state at t1. Then, the VLIW module 112 returns to POWER-ON state at t3. In this example, to prevent a delay from occurring because the VLIW module 112 is not fully awake at the time t3, the power managing unit 103 may activate the power supply to the VLIW module 112 at a time t4 that is before t3 at which VLIW mode begins. In this example, at the time t3 at which VLIW mode starts, the VLIW module 112 is already powered on, and thus the VLIW module 112 is able to operate without delay.

The power managing unit 103 may determine a time at which to power off the CGA module 111 or the VLIW module 112 based on the mode-switch signal 201. For example, the power managing unit 103 may selectively power off either the CGA module 111 or the VLIW module 112 at the time of mode switching.

The power managing unit 103 may determine a time at which to power on the CGA module 111 or the VLIW module 112 based on a power-on instruction. For example, the power-on instruction may be inserted into a program execution code by a compiler of the reconfigurable processor. In this example, the compiler of the reconfigurable processor shown in the example illustrated in FIG. 1 may analyze the program execution code to predict a time of mode switching, and insert the power-on instruction to turn on the CGA module 111 or the VLIW module 112 before the predicted mode switching time.

Figure 3:
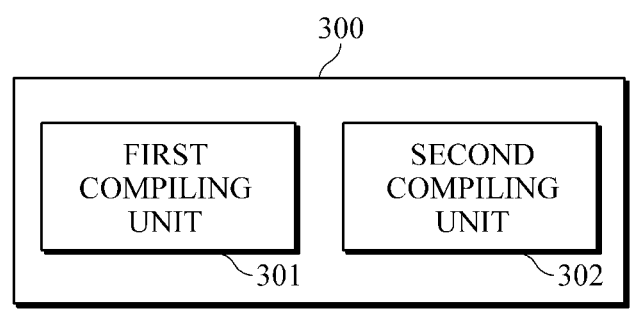
FIG. 3 is a diagram illustrating an example of a compiler.

FIG. 3 illustrates an example of a compiler.

Referring to the example illustrated in FIG. 3, compiler 300 includes a first compiling unit 301 and a second compiling unit 302.

Referring to the examples illustrated in FIGS. 1 and 3, the first compiling unit 301 may detect a loop exit decision node from a data dependency graph of a program that is to be run in the reconfigurable processor 100. The loop exit decision node may be a node illustrated in the data dependency graph of FIG. 4 that determines whether to end an iterative execution of a loop that is repeatedly processed. For example, if a currently executed loop satisfies conditions of the loop exit decision node, the execution may be terminated.

In addition, the first compiling unit 301 may insert a VLIW power-on instruction into a node that is next to the detected loop exit decision node to provide power to the VLIW module 112. For example, the nodes may correspond to code for executing a particular instruction in either CGA mode or VLIW mode. Prior to a stop instruction, the first compiling unit 301 may insert a power-on instruction into a node corresponding to code that is to be executed prior to the stop instruction.

Referring to the examples illustrated in FIGS. 1 and 3, the second compiling unit 302 may detect a CGA entry node from a control flow graph of the program that is to be run in the reconfigurable processor 100. The CGA entry node may be a node that stores context that is used to switch from VLIW mode to CGA mode, for example, live-in data and live-out data. The second compiling unit 302 may insert a CGA power-on instruction into a node that precedes the detected CGA entry node to supply power to the CGA module 111.

Further, the second compiling unit 302 may determine whether the node preceding the detected CGA entry node is a path branch node or not. If the node preceding the detected CGA entry node is a path branch node, a CGA power-off instruction may be inserted into a specific node on a path other than a path of the detected CGA entry node to shut off the power supply to the CGA module 111.

Figure 4:
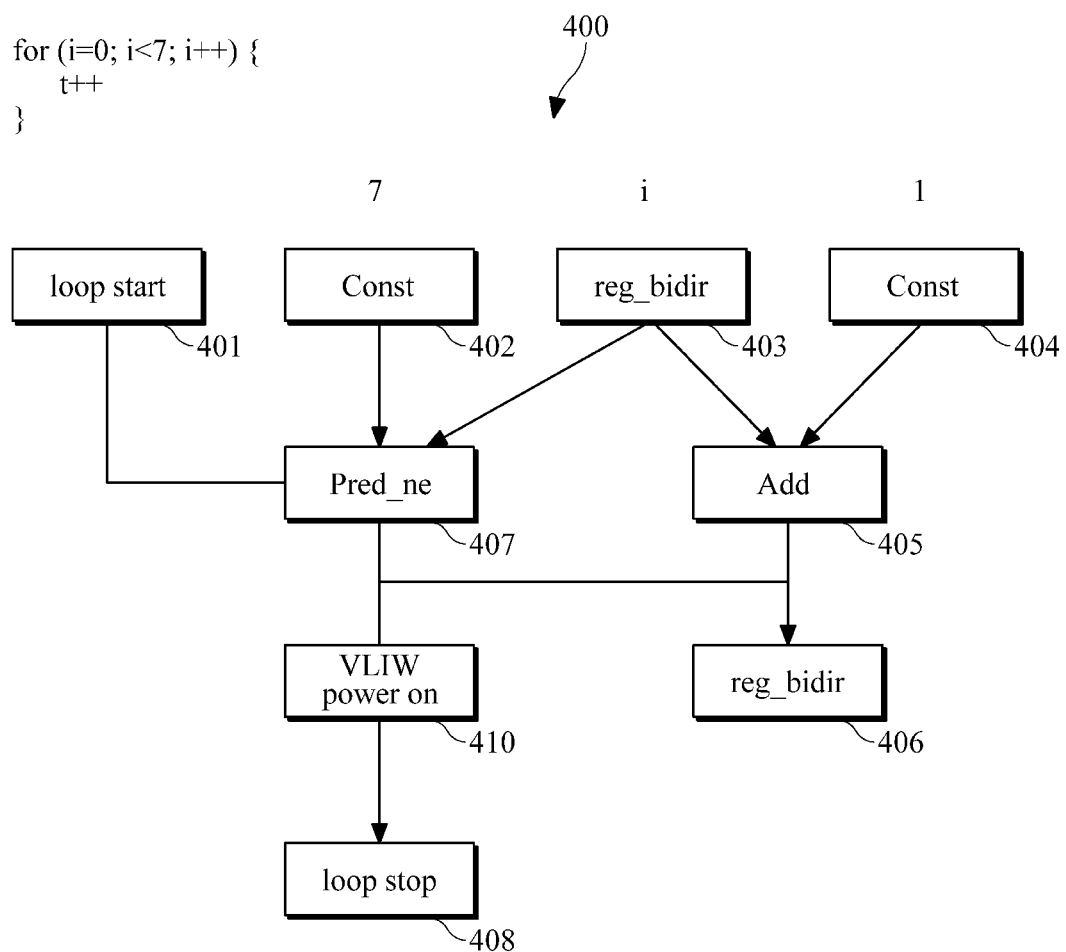
FIG. 4 is a diagram illustrating an example of a data dependency graph.

FIG. 4 illustrates an example of a data dependency graph.

Referring to the examples illustrated in FIGS. 1, 3 and 4, the first compiling unit 301 may analyze the data dependency graph 400. The data dependency graph 400 may be a graph with respect to a loop that executes an operation by increasing i, for example, from 0 to 7. In this example, the nodes represent operations of the loop from loop start 401 to loop stop 408. For example, the nodes may be code that is used to execute the loop operation.

In this example, nodes of the data dependency graph 400 may be instructions, constants, or variables. An initial node 401 may indicate initiation of a loop, and a loop stop node 408 may indicate termination of the loop. In this example, constant nodes 402 and 404 are allocated 7 and 1, respectively, and a variable node 403 is allocated a variable i. An add node 405 is a node that adds a value of constant node #1 402 and a value of the variable node 403, and the result is stored again as i by an update node 406. In the example, a loop exit decision node 407 may be connected to the loop stop node 408.

The loop exit decision node 407 may determine whether to terminate a loop or not. For example, the loop exit decision node 407 may receive the outputs form the constant node #1 and the variable node 403, and determine which conditions the states of each node satisfy. For example, the loop exit decision node 407 may determine whether a value of the variable node 403 is the same as a value of the constant node #1 402. If the variable node 403 has a value that is the same as the value of the constant node #1 402, the terminal node 408 may be executed, otherwise, the update node 406 may be executed. In this example, if i is not 7, a loop iterates, and if i becomes 7, the loop terminates.

In response to detecting the loop exit decision node 407, the first compiling unit 301 may insert a VLIW power-on instruction 410 into a node that is next to the loop exit decision node 407 and prior to the loop stop node 408. For example, the first compiling unit 301 may generate a new node between the loop exit decision node 407 and the loop stop node 408, and insert the VLIW power-on instruction 410 into the newly generated node. In this example, the VLIW power-on instruction 410 may be an instruction to initiate the power supply to the VLIW module 112.

In the example of FIG. 4, a loop operation is executed in CGA mode, loop execution is terminated, and VLIW mode initiates in response to executing the loop stop node 408. Because a VLIW power-on instruction is inserted after the loop exit decision node 407 but before the loop stop node 408, power supplied to the VLIW module 112 before VLIW mode starts, and thus the VLIW module 112 is able to process an operation without delay.

Figure 5:
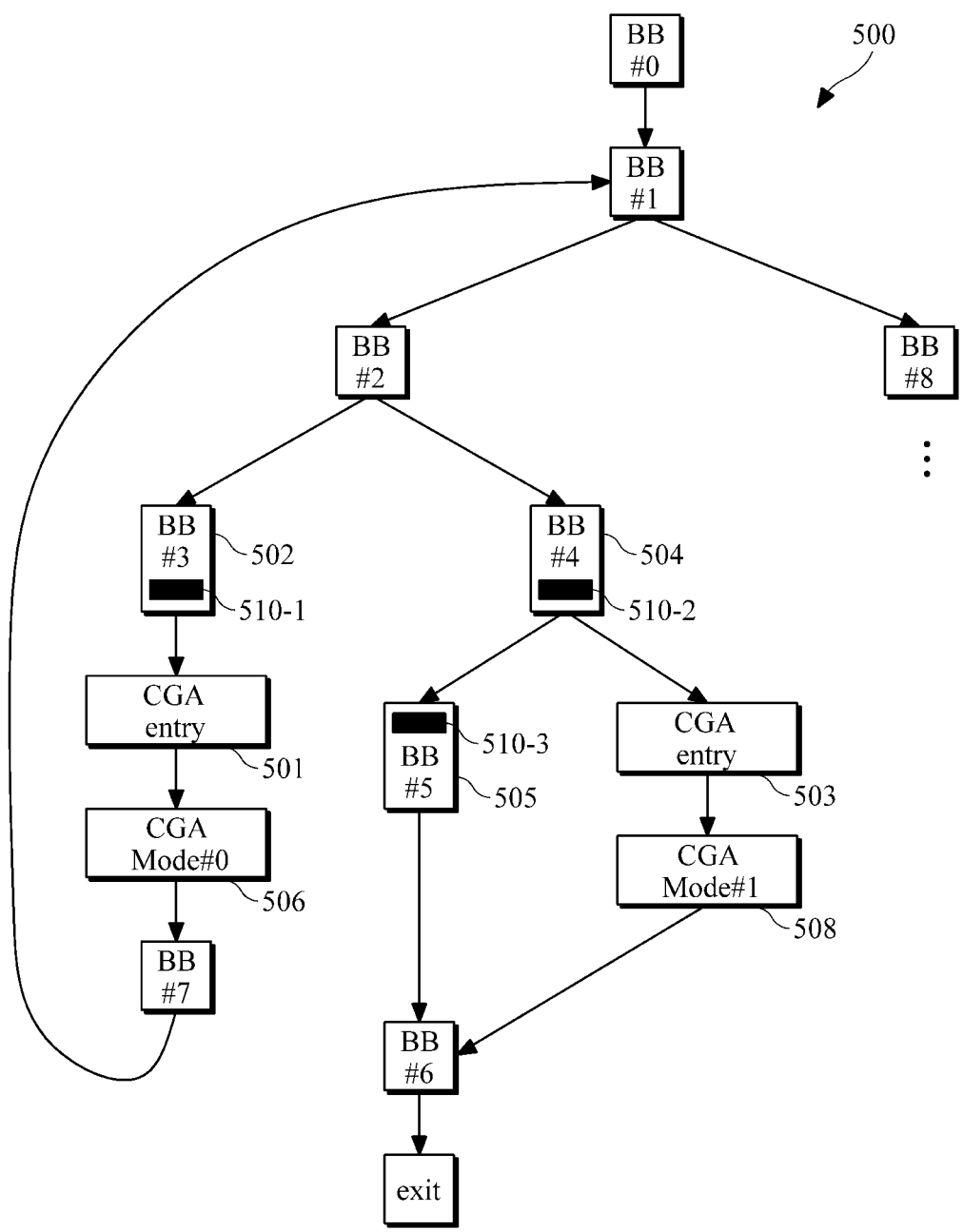
FIG. 5 is a diagram illustrating an example of a control flow graph.

FIG. 5 illustrates an example of a control flow graph.

Referring to the examples illustrated in FIGS. 1, 3 and 5, the second compiling unit 302 may analyze the control flow graph 500. The control flow graph 500 may be used to represent, for example, the execution order and branch states of basic blocks (BBs) that process an operation.

The second compiling unit 302 may detect a CGA entry basic block from the control flow graph 500. For example, the CGA entry basic block may store context such as live-in data and live-out data in the global register file 115 that may be used to switch VLIW mode to CGA mode. Further, the second compiling unit 302 may insert a CGA power-on instruction into a block preceding the detected CGA entry basic block. The CGA power-on instruction may be an instruction that when executed initiates the power supply to the CGA module 111.

For example, if CGA entry basic block #1 501 is detected, a CGA power-on instruction 510-1 may be inserted into a preceding basic block 502. Thus, before a CGA mode block 506 is executed, power supply to the CGA module 111 may be initiated, and thereby the CGA module 111 may process an operation without delay.

As another example, the second compiling unit 302 may determine whether path branch is present in a block preceding the detected CGA entry basic block, and may insert a CGA power-off instruction in a specific path.

For example, if CGA entry basic block #2 503 is detected, the second compiling unit 302 may determine whether a preceding basic block 504 is a path branch block. In this example, two execution paths are available from basic block #4 504. Accordingly, the second compiling unit 302 may select an arbitrary basic block, for example, basic block #5 505, on a path which is not connected to the detected CGA entry basic block #2 503, and insert a CGA power-off instruction 510-3 into the selected basic block #5 505.

The CGA power-off instruction 510-3 may be in preparation for an event in which the mode is not switched to CGA mode because a path proceeds from the basic block #4 504 to the basic block #5 505. In this example, the CGA power-off instruction 510-3 may prevent the CGA module 111 from being unnecessarily powered on due to the CGA power-on instruction being inserted into the basic block #4 504 when the path does not proceed to CGA mode #1 508.

Figure 6:
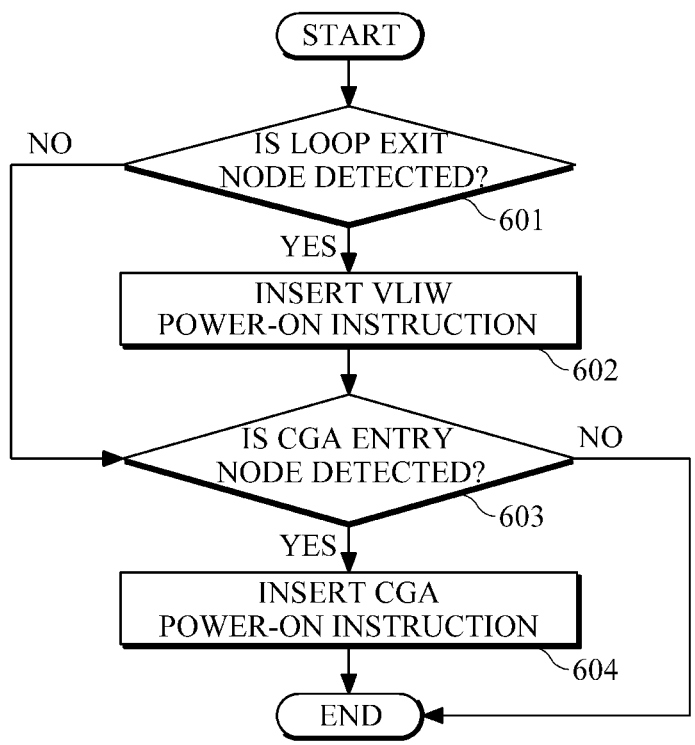
FIG. 6 is a flowchart illustrating an example of a compiling method.

FIG. 6 illustrates an example of a compiling method.

Referring to the examples illustrated in FIGS. 1, 3, and 6, the compiler 300 detects the loop exit decision node that determines whether to terminate iterative execution of a loop in the data dependency graph of a program to be run in the reconfigurable processor 100 (601). In response to the loop exit node being detected, the compiler 300 inserts a VLIW power-on instruction into a node next to the detected loop exit decision node to supply the power to the VLIW module 112 (602). For example, as shown in FIG. 4, the first compiling unit 301 may detect an operation to be switched from CGA mode to VLIW mode, and may insert an instruction for powering on the VLIW module 112 in advance before the detected operation is executed. If the loop exit node is not detected in 601, the method advances to 603.

The compiler 300 detects a CGA entry node that stores context for switching VLIW mode to CGA mode in a control flow graph of a program to be run in the reconfigurable processor 100 (603). In response to detecting a CGA entry node, the compiler 300 inserts a CGA power-on instruction into a node preceding the detected CGA entry node so as to supply the power to the CGA module 111 (604). If the CGA entry node is not detected, the method terminates.

For example, the second compiling unit 302, as shown in FIG. 5, may detect an operation which is to be executed and switch from VLIW mode to CGA mode, and insert an instruction for powering on the CGA module 111 in advance before the detected operation is executed.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A non-transitory computer-readable storage medium comprising a compiler for a reconfigurable processor that comprises a coarse-grained array (CGA) mode utilizing a CGA module comprising a first plurality of functional units and a very long instruction word (VLIW) mode utilizing a VLIW module comprising a second plurality of functional units, the compiler being configured to;
    detect a loop entry node that stores context for switching to a VLIW mode;
    in response to detecting the loop entry, insert a CGA power-on instruction into a node preceding the detected CGA entry node, to cause the reconfigurable processor to supply power to the CGA module;
    determine if the node prior to the detected loop entry node is a branch node;
    in response to determining the node prior to the detected CGA entry node is a branch node, insert a CGA power-off instruction into a node on any branch of the branch node that is not connected to the detected loop entry node;
    detect a loop exit decision node, and in response to detecting the loop exit decision node, insert a VLIW power-on instruction in a node next to a detected loop exit decision node and prior to a loop exit node to cause the reconfigurable processor to supply power to the VLIW module, wherein the loop exit decision node determines whether to terminate iterative execution of a loop in a data dependency graph of a program to be run in the reconfigurable processor.

2. A non-transitory computer-readable storage medium comprising a compiler for a reconfigurable processor that comprises a coarse-grained array (CGA) mode utilizing a CGA module comprising a first plurality of functional units and a configuration memory and a very long instruction word (VLIW) mode utilizing a VLIW module comprising a second plurality of functional units and a VLIW memory, the compiler being configured to:
    detect a CGA entry node, and in response to detecting the CGA entry node insert a CGA power-on instruction into a node prior to the detected CGA entry node that stores context for switching the VLIW mode to the CGA mode from a control flow graph of a program to be run in the reconfigurable processor;
    determine if the node prior to the detected CGA entry node is a branch node, and in response to determining the node prior to the detected CGA entry node is a branch node, insert a CGA power-off instruction into a node on any branch of the branch node that is not connected to the detected loop entry node; and
    detect a loop exit decision node, and in response to detecting the loop exit decision node, insert a VLIW power-on instruction in a node next to a detected loop exit decision node and prior to a loop exit node to cause the reconfigurable processor to supply power to the VLIW module, wherein the loop exit decision node determines whether to terminate iterative execution of a loop in a data dependency graph of a program to be run in the reconfigurable processor.

3. A non-transitory computer-readable storage medium comprising a compiler for a reconfigurable processor that comprises a plurality of functional units, that processes a loop operation in a coarse-grained array (CGA) mode based on a CGA module that comprises a first plurality of functional units, and that processes an operation other than the loop operation in a very long instruction word (VLIW) mode based on a VLIW module that comprises a second plurality of functional units, the compiler comprising:
    a first compiling unit configured to detect a loop exit decision node that is defined as a node that determines whether to terminate iterative execution of a loop in a data dependency graph of a program to be run in the reconfigurable processor, and in response to the detected loop exit decision node, inserts a VLIW power-on instruction into a node next to the detected loop exit decision node and prior to a loop exit node to cause the reconfigurable processor to supply power to the VLIW module; and
    a second compiling unit configured to detect a CGA entry node that stores context for switching the VLIW mode to the CGA mode from a control flow graph of a program to be run in the reconfigurable processor, and in response to detecting a CGA entry node, inserts a CGA power-on instruction into a node prior to the detected CGA entry node to cause the reconfigurable processor to supply power to the CGA module, determines if the node prior to the detected CGA entry node is a branch node, and if so the second compiling unit inserts a CGA power-off instruction into a node on any branch of the branch node that is not connected to the detected CGA entry node.

4. A method of compiling for a reconfigurable memory that comprises a plurality of functional units, that processes a loop operation in a coarse-grained array (CGA) mode based on a CGA module that comprises a first plurality of functional units, and that processes an operation other than a loop operation in a very long instruction word (VLIW) mode based on a VLIW module that comprises a second plurality of functional units, the method comprising:

detecting a loop exit decision node that is defined as a node that determines whether to terminate iterative execution of a loop in a data dependency graph of a program to be run in the reconfigurable processor, and in response to detecting the loop exit decision node, inserting a VLIW power-on instruction into a node next to the detected loop exit decision node and prior to a loop exit node to cause the reconfigurable processor to supply power to the VLIW module; and detecting a CGA entry node that stores context for switching the VLIW mode to the CGA mode from a control flow graph of a program to be run in the reconfigurable processor, and in response to detecting the CGA entry node, inserting a CGA power-on instruction into a node prior to the detected CGA entry node to cause the reconfigurable processor to supply power to the CGA module, and if the node prior to the detected CGA entry node is a branch node inserting a CGA power-off instruction into a node on any branch of the branch node that is not connected to the detected CGA entry node.

5. A non-transitory computer-readable storage medium comprising a compiler for a reconfigurable processor that is to process a program that is represented by nodes on a data dependency graph, the compiler comprising:

a first compiling unit configured to analyze the data dependency to detect a loop exit decision node that determines whether to execute a loop, and configured to insert a very long instruction word (VLIW) power-on instruction into a node on the data dependency graph that is after the loop exit decision node and previous to a loop exit node in response to detecting the loop exit decision node, wherein the VLIW power-on instruction is configured to cause the reconfigurable processor to power on a VLIW module of the reconfigurable processor, prior to processing the loop exit node, and wherein the VLIW module comprises a first plurality of functional units; and a second compiling unit configured to analyze the data dependency graph to detect a coarse-grained array (CGA) entry node, and configured to insert a CGA power-on instruction into a node on the data dependency graph that is previous to the CGA entry node, wherein the CGA power-on instruction is configured to cause the processor to power on a CGA module of the reconfigurable processor, prior to processing the CGA entry node, and if the node prior to the detected CGA entry node is a branch node insert a CGA power-off instruction into a node on any branch of the branch node that is not connected to the detected CGA entry node, and wherein the CGA module comprises a second plurality of functional units.

6. The storage medium of claim 5, wherein the nodes on the data dependency graph are instructions, constants, and/or variables for processing the program, and the reconfigurable processor is configured to process the program based on the instructions, constants, and/or variables included in the nodes of the dependency graph.

7. The storage medium of claim 5, wherein the compiler analyzes the data dependency graph while the reconfigurable processor is processing the program based on the data dependency graph.

\* \* \* \* \*